United States Patent

Schoenhenz

Patent Number: 5,741,986
Date of Patent: Apr. 21, 1998

[54] THICKNESS FILTER DEVICE FOR USE IN AN INSERTION CHUTE OF A READER FOR TICKETS, CARDS AND THE LIKE

[75] Inventor: Daniel Schoenhenz, Ballencourt, France

[73] Assignee: Compagnie Generale D'Automatisme—CGA-HBS, Bretiqny sur Orge, France

[21] Appl. No.: 799,572

[22] Filed: Feb. 12, 1997

[30] Foreign Application Priority Data

Feb. 16, 1996 [FR] France .................. 96 011947

[51] Int. Cl.⁶ ........................ G06K 13/08
[52] U.S. Cl. ............ 73/865.9; 235/480; 271/902
[58] Field of Search .............. 194/200, 344, 194/345; 193/35 B, 42; 271/3.14, 256, 902; 235/475, 480, 483; 73/865.9

[56] References Cited

U.S. PATENT DOCUMENTS

| | | |
|---|---|---|
| 3,947,663 | 3/1976 | De Sandre et al. . |
| 4,007,356 | 2/1977 | Stucke et al. ............ 235/480 |
| 4,534,551 | 8/1985 | Jones ................... 271/902 |
| 5,179,504 | 1/1993 | Kitahara . |

FOREIGN PATENT DOCUMENTS

0460301A1  12/1991  European Pat. Off. .

OTHER PUBLICATIONS

IBM, Lightner et al., "Feed Mechanism for Document Cards"., Jun. 1972.

*Primary Examiner*—Robert Raevis
*Attorney, Agent, or Firm*—Sughrue, Mion, Zinn, Macpeak & Seas, PLLC

[57] ABSTRACT

A thickness filter device is for use in an insertion chute of a reader for tickets, cards or the like. The device includes a mobile assembly comprising a stirrup member in the form of a yoke pivoting about a fixed axis parallel to a flat support along which the ticket, card or the like passes and perpendicular to a direction of displacement of said ticket, card or the like along this plane and a roller mounted in the stirrup member. The roller has a support shaft parallel to the fixed shaft and mounted in the stirrup member with play so that, in the absence of any ticket, card or the like between the roller and the support plane, it allows the roller to be pressed onto this plane with a pressure calibrated by traction spring means. This play also allows the roller, under the effect of a force opposing the action of the spring means, to bear against a wall of the stirrup member linking two parallel flanges of said stirrup member forming a yoke. With no ticket, card or the like on the support plane, the plane containing the fixed shaft and the support shaft is at an acute angle α to a plane normal to the support plane and containing the fixed shaft. The plane containing the two shafts is on the same side of the normal plane as the ticket, card or the like before it is inserted into the machine. The stirrup member is additionally acted on by spring means maintaining the angle α constant provided that the only friction force on the roller is that of its shaft during its rotation, and therefore with no contact between the roller and the wall of the stirrup member.

8 Claims, 2 Drawing Sheets

1

THICKNESS FILTER DEVICE FOR USE IN AN INSERTION CHUTE OF A READER FOR TICKETS, CARDS AND THE LIKE

BACKGROUND OF THE INVENTION

1. Field of the Invention

The present invention concerns a thickness filter device for use in an insertion chute of a reader for tickets, cards and the like of any kind of machine, enabling a greater thickness than that inserted to be fed out through the same chute.

2. Description of the Prior Art

At present a simple calibrated entry slot is used that has the disadvantage of not allowing the ticket, card or the like to be returned if it is crumpled during processing, after insertion in the machine, which causes a jam.

Mechanically or electromechanically operated shutter systems are known in themselves, but these systems are costly and unreliable.

Accordingly, an aim of the invention is to propose a simple and effective device enabling the insertion of thin tickets, cards or the like whilst easily allowing a ticket, card or the like to be returned via the same path with a thickness that would not have allowed it to be inserted, caused by some degree of crumpling during its processing, for example. The invention also procures a calibrated pressure when the ticket, card or the like is inserted and returned.

SUMMARY OF THE INVENTION

Accordingly, the invention consists in thickness filter device for use in an insertion chute of a reader for tickets, cards or the like of any kind of machine, said ticket, card or the like following a common path upon insertion and upon return, so that a surface of said ticket, card or the like is pressed against a plane support, said device including a mobile assembly comprising a stirrup member in the form of a yoke pivoting about a fixed shaft parallel to said plane support and perpendicular to a direction of displacement of said ticket, card or the like along this plane and a roller mounted in said stirrup member, said roller having a support shaft parallel to said fixed shaft and mounted in said stirrup member with play so that, in the absence of any ticket, card or the like between said roller and said plane support, it allows said roller to be pressed onto said support with a pressure calibrated by traction spring means acting on said support shaft in a direction towards said plane support and perpendicular thereto, said play also allowing said roller, under the effect of a force opposing the action of said spring means, to bear against a wall of said stirrup member linking two parallel flanges of said stirrup member forming a yoke, wherein with no ticket, card or the like on said plane support, the plane containing said fixed shaft and said support shaft is at an acute angle α to a plane normal to said support plane and containing said fixed shaft, said plane containing said two shafts being on the same side of said normal plane as said ticket, card or the like before it is inserted into said chute of said machine, said stirrup member being additionally acted on by spring means maintaining said angle α constant provided that the only friction force on said roller is that of its support shaft during its rotation, and therefore with no contact between said roller and said wall of said stirrup member.

One example of the invention will now be described with reference to the accompanying drawings.

DETAILED DESCRIPTION OF THE PREFERRED EMBODIMENT

Figure 1:
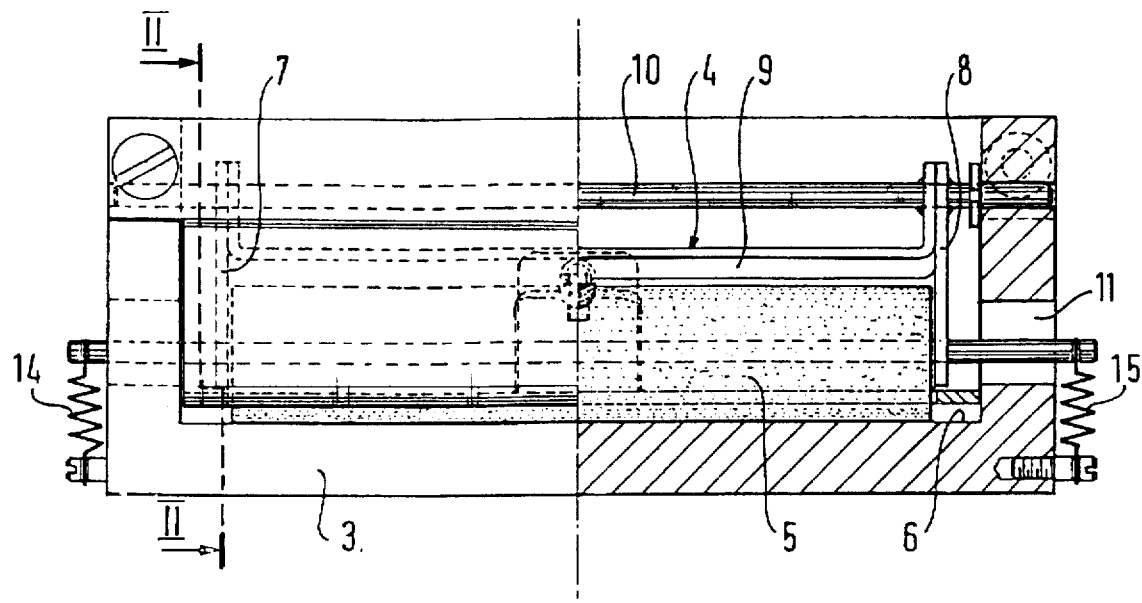
FIG. 1 shows a front view, half in section taken along the line I—I in FIG. 2, of a thickness limiting device of the invention for use in the insertion chute of a reader for tickets, cards or the like in a machine of any kind.
Figure 2:
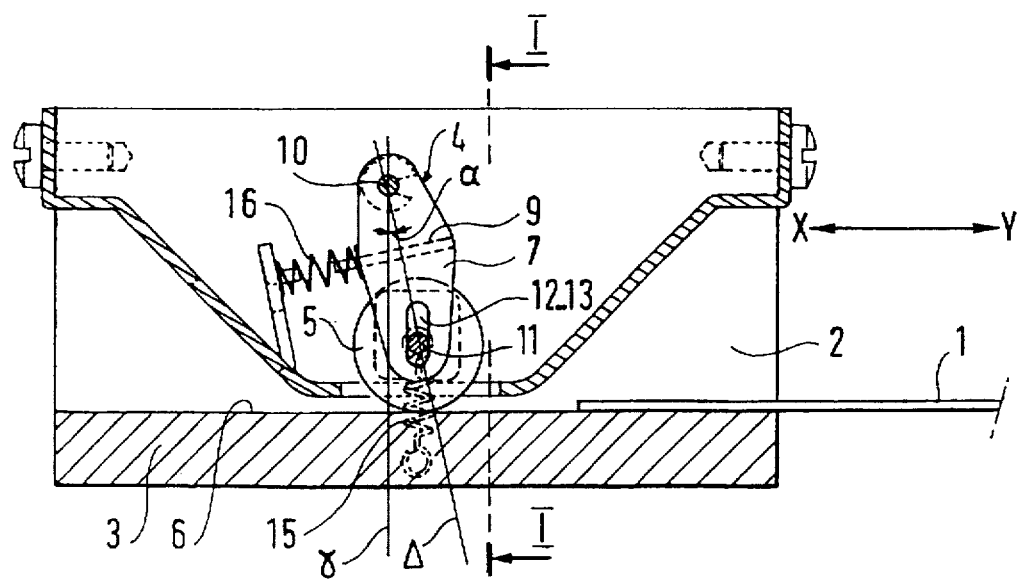
FIG. 2 is a view of the device in section taken along the line II—II in FIG. 1.

Referring to FIGS. 1 and 2, the device for reading tickets, cards or the like 1, which is located at the front of a machine of any kind, consists in a filter limiting the thickness of the ticket, card or the like that can be inserted in a chute 2.

The device comprises a frame 3 on which is mounted a mobile assembly comprising a stirrup member 4 and a roller 5 mounted in the stirrup member. The frame 3 has a plane baseplate constituting a plane support 6 for a ticket, card or the like 1 that moves with one of its surfaces pressed against the plane support 6.

The stirrup member 4 forms a yoke having two flanges 7 and 8 linked by a wall 9. It pivots about a fixed shaft 10 joined to the frame 3. The shaft 10 is parallel to the support plane 6 and perpendicular to the direction X, Y in which the ticket, card or the like 1 moves (X on insertion, Y on return).

Figure 4:
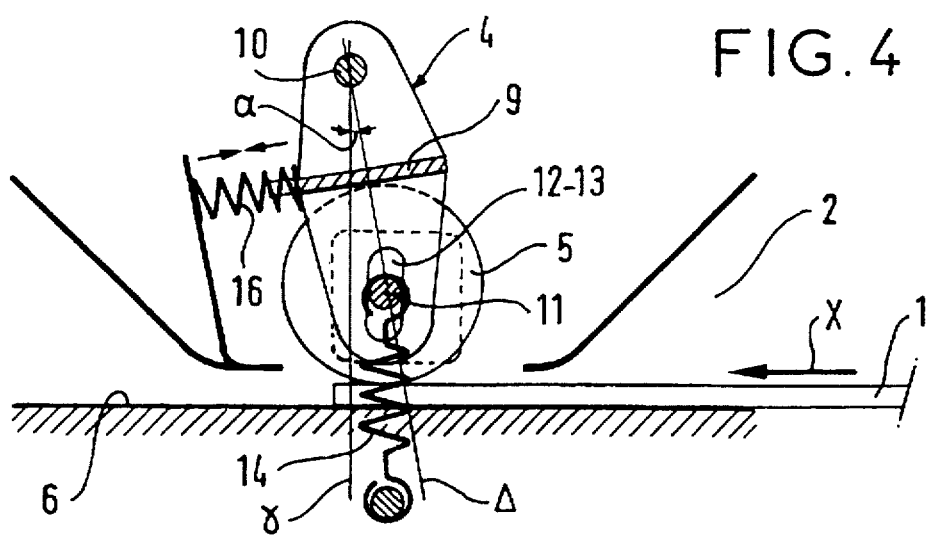
FIG. 4 shows the situation in which the ticket, card or the like is too thick and cannot pass.

The roller 5 is mounted in the stirrup member 4 by means of a support shaft 11 passing through oblong holes 12 and 13 in the flanges 7 and 8 so that the roller has some degree of play in the stirrup member 5. The support shaft 11 is parallel to the fixed shaft 10. The play of the roller 5 in the stirrup member 4 permitted by the oblong holes 12 and 13 allows the roller 5 to rest directly on the plane support 6, if there is no ticket, card or the like 1 between the roller and the support plane 6, as shown in FIG. 2, applying thereto a force calibrated by two return springs 14 and 15 applying traction to the support shaft 11 in the direction towards and perpendicular to the support plane 6. This play also allows the roller 5 to contact the wall 9 linking the two flanges 7 and 8 of the stirrup member 4, against the pull of the springs 14 and 15. This position is that shown in the FIG. 4 functional diagram which shows a ticket, card or the like 1 with a limiting thickness preventing it passing: the more it is forced, the harder it will jam.

In the position shown in FIG. 2, and therefore at rest, with no ticket between the roller 5 and the support plane 6, the plane Δ containing the fixed (geometrical) axis 10 and the support (geometrical) axis 11 is at an acute angle α to the plane γ perpendicular to the plane support 6 and containing the (geometrical) axis 10. The plane Δ containing the two axes 10 and 11 is on the same side of the plane γ as the ticket, card or the like 1 before it is inserted in the machine.

Figure 3:
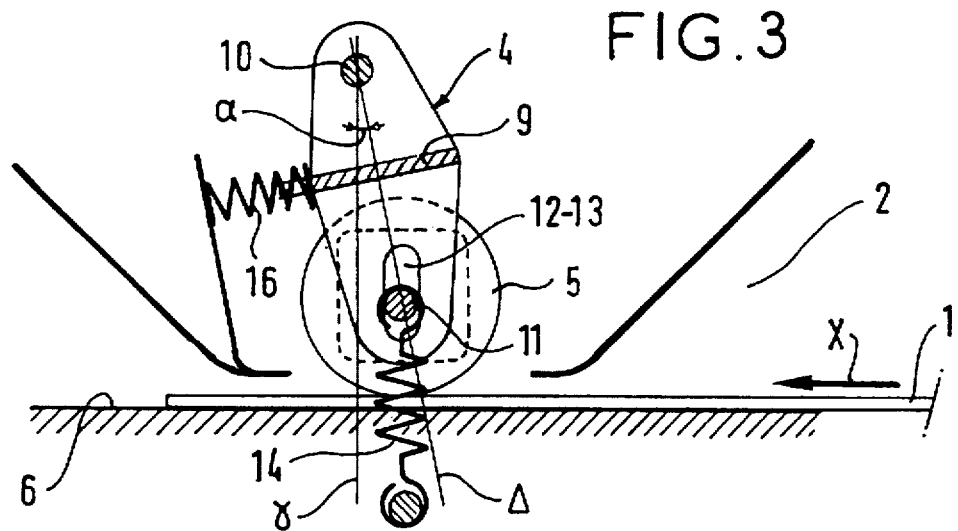
FIG. 3 is a diagram showing the operation of the device in the case of a ticket, card or the like of the correct thickness.

Finally, the stirrup member 4 is subject to the action of a thrust spring 16 which compensates the action of the friction force of the support shaft 11 for the roller 5 when it rotates so that, provided that the thickness of a ticket, card or the like 1 is such that the roller 5 does not rub against the wall 9 of the stirrup member, the only friction force is that of the support shaft 11 due to the rotation of the roller, and the angle α then remains constant; this is the situation shown in FIG. 3 in which the ticket, card or the like 1 can pass. On the other hand, if the thickness of the ticket, card or the like is such that the roller rubs against the wall 9, then pushing the ticket, card or the like into the device compresses the spring 16 and rotates the stirrup member 4, which reduces the angle α and therefore the gap between the plane support 6 and the roller 5, jamming the ticket, card or the like. This jamming effect increases if more force is applied, preventing insertion of the ticket, card or the like. This is the situation shown in FIG. 4.

Figure 5:
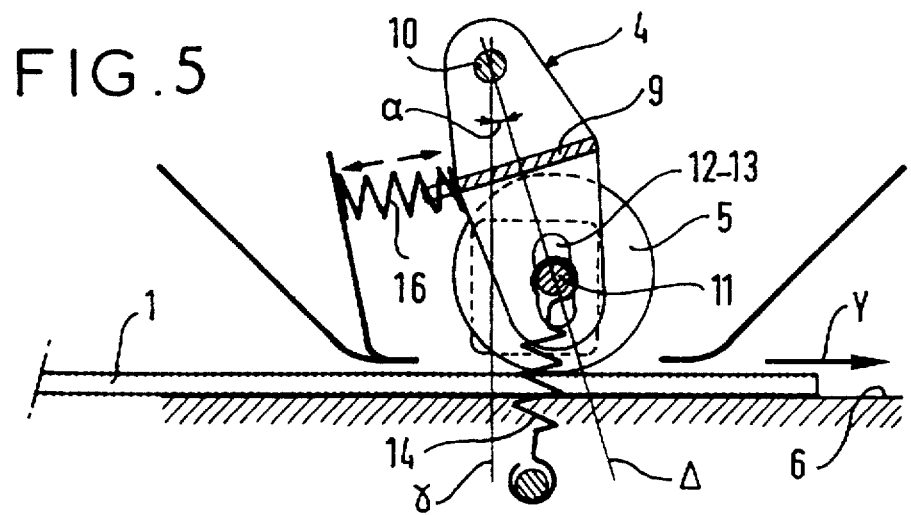
FIG. 5 shows the return of a ticket, card or the like, without difficulty, despite the fact that during treatment, after insertion into the machine, it has become crumpled so that its apparent thickness is greater than when it was inserted and such that on insertion it would not have passed.

If the ticket, card or the like 1 is crumpled during its treatment in the machine so that its apparent thickness (because of ripples, for example) is greater than that allowing it to be inserted, there is no difficulty in returning it since the effect of the ticket, card or the like being pushed in the direction Y by the drive means of the machine, not shown, is to increase the angle α and therefore the distance between the plane support 6 and the roller 5. This is the situation shown in FIG. 5.

The person skilled in the art will know how to determine the play of the roller in the rest position (FIG. 2) for the maximal thickness of the ticket, card or the like and the angle α at rest in accordance with the coefficients of friction and the required jamming force. The surface of the roller 5 is advantageously of rubber.

There is claimed:

1. Thickness filter device for use in an insertion chute of a reader for cards, said cards following a common path upon insertion and upon return, so that a surface of said card is pressed against a plane support, said device including a mobile assembly comprising a stirrup member in the form of a yoke pivoting about a fixed shaft parallel to said plane support and perpendicular to a direction of displacement of said card along said plane support and a roller mounted in said stirrup member, said roller having a support shaft parallel to said fixed shaft and mounted in said stirrup member with play so that, in the absence of any card between said roller and said plane support, it allows said roller to be pressed onto said support with a pressure calibrated by traction spring means acting on said support shaft in a direction towards said plane support and perpendicular thereto, said play also allowing said roller, under the effect of a force opposing the action of said spring means, to bear against a wall of said stirrup member linking two parallel flanges of said stirrup member forming a yoke, wherein with no card on said plane support, the plane containing said fixed shaft and said support shaft is at an acute angle α to a plane normal to said support plane and containing said fixed shaft, said plane containing said two shafts being on the same side of said normal plane as said card before it is inserted into said chute of said machine, said stirrup member being additionally acted on by a second spring means for maintaining said angle α constant provided that the only friction force on said roller is that of its support shaft during its rotation, and therefore with no contact between said roller and said wall of said stirrup member.

2. Thickness filter device for use in an insertion chute of a reader for cards, said cards following a common path upon insertion and return, so that a surface of said card is pressed against a plane support, said device including a mobile assembly comprising a stirrup member in the form of a yoke pivoting about a fixed shaft parallel to said plane support and perpendicular to a direction of displacement of said card along said plane support, and a roller mounted in said stirrup member on a support shaft parallel to said fixed shaft, means for providing play of said shaft in said stirrup member, and first biasing means for biasing said roller in the direction of said plane support such that in the absence of any card between said roller and said plane support said first biasing means provides a calibrated pressure acting on said support in a direction towards said plane support and perpendicular thereto, and wherein said means for providing play also allows said roller, under the effect of a force opposing the action of said first biasing means, to bear against a wall to a side of said roller opposite that of said plane support of said stirrup member linking two parallel flanges of said stirrup member forming a yoke, such that with no card on said plane support, a plane containing said fixed shaft and said support shaft is at an actuate angle α to a plane normal to said support plane and containing said fixed shaft, with said plane containing said two shafts being on the same side of said normal plane as said card before it is inserted into said chute of said machine, and second biasing means for biasing said stirrup member away from said normal plane for maintaining said angle α constant provided that the only friction force on said roller is that of said support shaft during shaft rotation, and therefore with no contact between said roller and said wall of said stirrup member.

3. The thickness filter device as claimed in claim 2, wherein said means for providing play of said support shaft comprises a pair of aligned elongated slots respectively within said parallel flanges and extending away from said wall in the direction of said plane support.

4. The thickness filter device as claimed in claim 3, wherein said elongated slots extend parallel to said normal plane.

5. The thickness filter device as claimed in claim 4, wherein said first biasing means comprises a traction spring, and said second biasing means comprises a thrust spring.

6. The thickness filter device as claimed in claim 3, wherein said first biasing means comprises a traction spring, and said second biasing means comprises a thrust spring.

7. The thickness filter device as claimed in claim 2, wherein said first biasing means comprises a traction spring, and said second biasing means comprises a thrust spring.

8. The thickness filter device as claimed in claim 7, wherein said traction spring is connected at one end to said support shaft, and at an opposite end to said plane support.

* * * * *